United States Patent [19]
Humphries

[11] Patent Number: 6,092,584
[45] Date of Patent: *Jul. 25, 2000

[54] VEHICLE SUNSHIELD AND METHOD OF MANUFACTURE

[76] Inventor: L. Lee Humphries, 7821 Tibana St., Long Beach, Calif. 90808

[ * ] Notice: Under 35 U.S.C. 154(b), the term of this patent shall be extended for 331 days.

[21] Appl. No.: 08/543,057

[22] Filed: Oct. 13, 1995

[51] Int. Cl.[7] ........................................ B60J 3/00
[52] U.S. Cl. ....................................... 160/370.23
[58] Field of Search ............. 160/370.23, 84.04, 160/84.01, 348, DIG. 7, 231.1, 405

[56] References Cited

U.S. PATENT DOCUMENTS

| | | | |
|---|---|---|---|
| 2,874,770 | 2/1959 | Rohr et al. | |
| 3,279,845 | 10/1966 | Lutz. | |
| 4,083,395 | 4/1978 | Romano | 160/84.04 X |
| 4,194,313 | 3/1980 | Downing | 160/135 X |
| 4,202,396 | 5/1980 | Levy. | |
| 4,317,481 | 3/1982 | Oswald. | |
| 4,535,828 | 8/1985 | Brockhaus. | |
| 4,671,334 | 6/1987 | Yadegar et al. | 160/370.23 X |
| 4,711,046 | 12/1987 | Herrgord | 160/231.1 X |
| 4,848,825 | 7/1989 | Niernberger | 160/370.23 X |
| 4,947,920 | 8/1990 | Moll | 160/370.23 X |
| 5,131,448 | 7/1992 | Miller | 160/231.1 X |
| 5,267,599 | 12/1993 | Kim | 160/370.23 |
| 5,324,090 | 6/1994 | Lehnhoff | 160/370.23 X |

*Primary Examiner*—David M. Purol
*Attorney, Agent, or Firm*—L. Lee Humphries

[57] ABSTRACT

A vehicle sunshield which is foldable in an accordion-like manner and method of making a foldable sunshield comprising an impressionable material having a plurality of successive creases or channels on the same side of the material. Alternate creases are wider to allow folding the sunshield over the alternate creases.

8 Claims, 4 Drawing Sheets

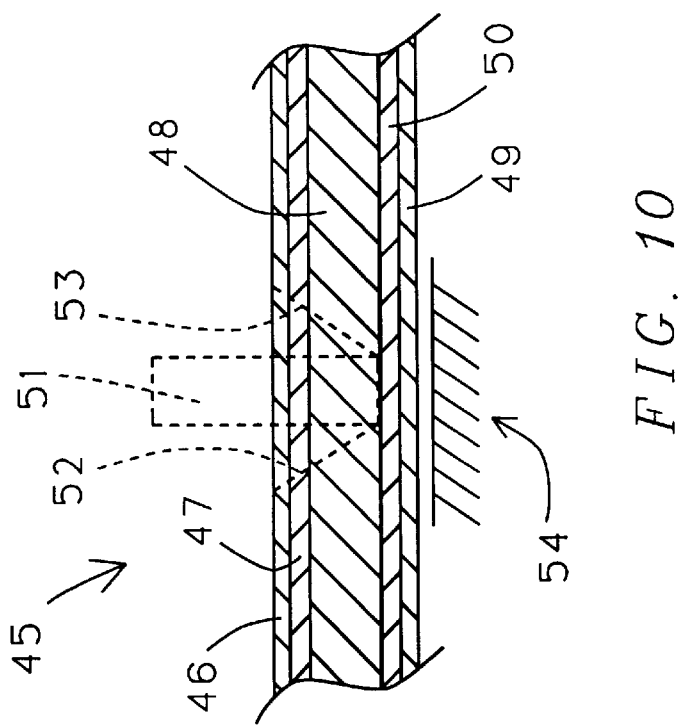
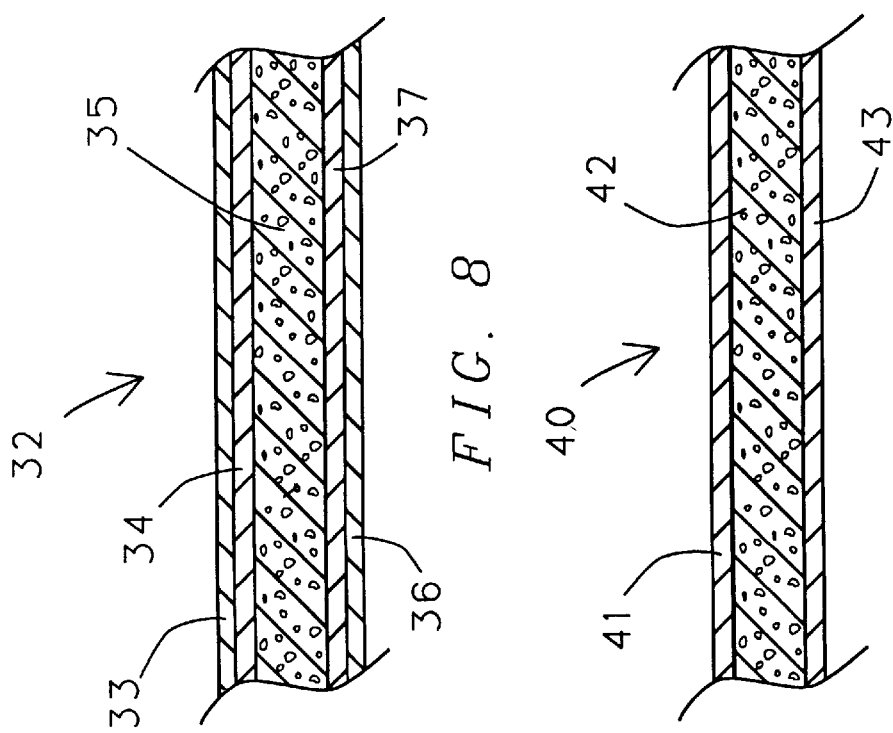

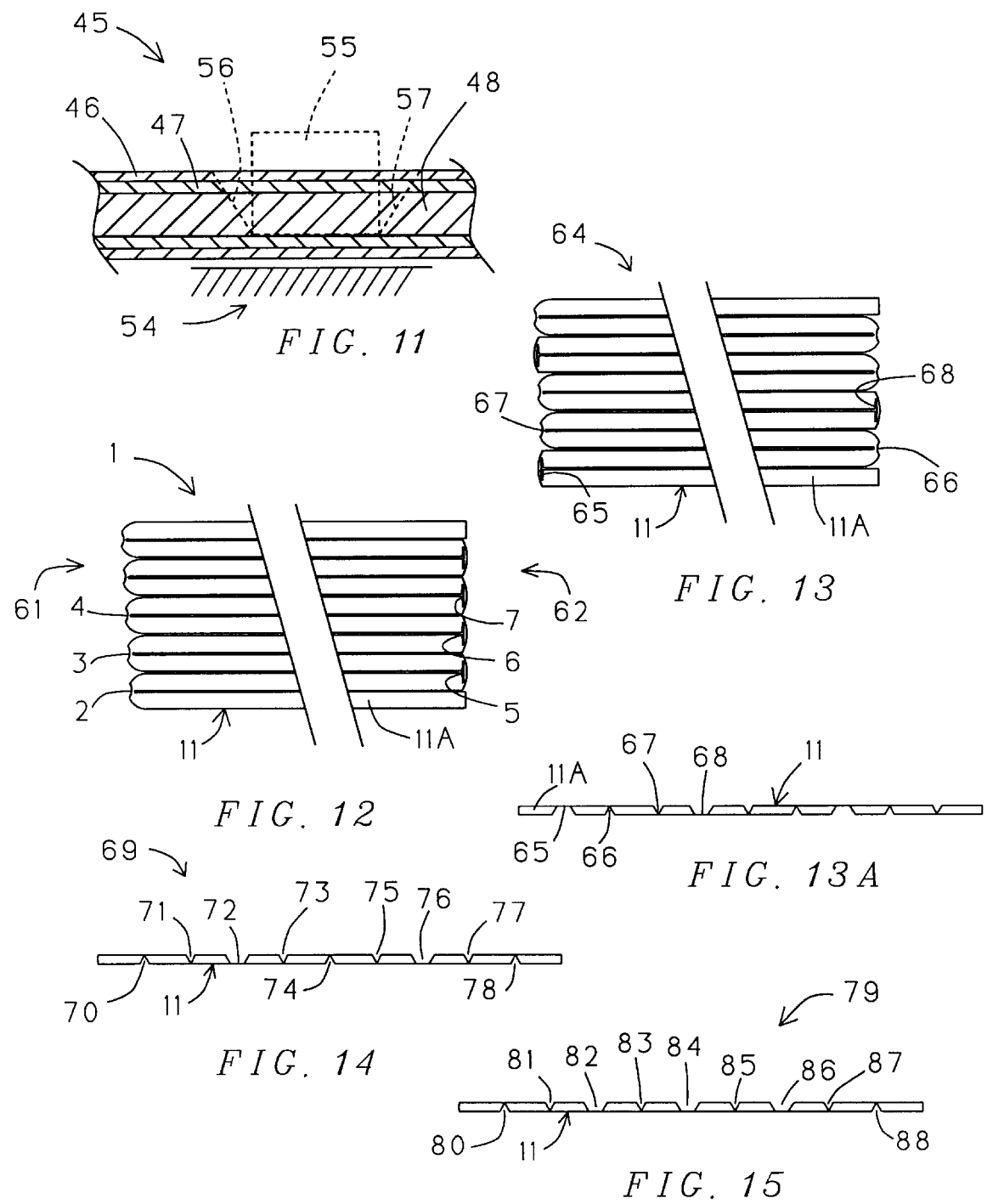

VEHICLE SUNSHIELD AND METHOD OF MANUFACTURE

This invention relates to foldable sunshields for automobile and vehicle windows, including, particularly, the windshield, and the method of manufacture of such sunshields.

BACKGROUND OF THE INVENTION

Prior art sunshields for covering the interior sides of the windshields of automobiles, particularly those made in accordance with Levy, U.S. Pat. No. 4,202,396, have enjoyed a rather remarkable success. Sunshields made in accordance with Levy are comprised of about 10 elongated, rectangular panels, each slightly over 5 inches wide and approximately 20¼ inches long. The successive panels in Levy are folded in alternate directions, that is, the panels are folded accordion-like. Various other sunshields have also proved to be readily accepted in the automobile sunshield market, such as those covered by Zheng U.S. Pat. No. 4,815,784. Kim, U.S. Pat. No. 5,267,599, shows parallel creases, or channels, alternately located on opposing sides of a foam material, so that it can be alternately folded in opposite directions from the crease. Kim shows a sunshield comprised of 4 rectangular panels and a sunshield comprised of 5 rectangular panels. Niernberger, U.S. Pat. No. 4,848,825 teaches a trapezoidal panel on each end of an automobile windshield cover which is used on the outside of an automobile windshield.

SUMMARY OF THE INVENTION

This invention is an improved, foldable sunshield of semi-rigid, "impressionable material". By "impressionable material" is meant material that can be impressed with a crease, or which can be manufactured with such a crease or channel and which will retain all or part of such crease or channel enabling the material to readily be folded thereafter along the crease. A "channel" is considered to include within its meaning, a "crease". Crease, by definition, includes, without limitation, folding. That is, a "crease" is a particular manner of creating a "channel". So, "channel" is defined herein as broader and inclusive of "crease". A "channel" may be formed in the material as it is manufactured or in other ways, and, thus, might not be formed by creasing. For some materials, it may be required that the material or the creasing die or block be heated in order to suitably impress the material. The creases or channels which are then in the sunshield material allow the sunshield to be easily folded and put away and, later, unfolded and thus used many times.

The sunshield is preferably fitted to and used on the interior side of the windshield of a vehicle or an automobile, however, it may be used on the outside of an automobile window as shown in U.S. Pat. No. 4,848,825, or it may be used on the inside or outside of the rear window or any other window of a vehicle or an automobile. However, it is adapted best to be used on the interior side of the windshield of an automobile. It is so adapted by fitting it, in its unfolded condition, to the size and shape of such interior side of the windshield of an automobile. It is constructed best to fit under the visors when they are down and to fit around the rear view mirror or to have a cutout through which the mirror and the strut which holds it, can extend.

The sunshield is formed of a core material which is impressionable. Among the various impressionable materials are foam material, foam-like material, cellular material, cardboard, particularly the corrugated kind, and various bubble plastics and crinkle plastics. Numerous polymers are manufactured in the form of a foam. Usually this is accomplished by mixing the polymer, or plastic, with a blowing agent which is a gas that is often nitrogen. This forms a cellular material. Both thermoplastic and thermoset polymers are converted into foams in this and other ways. Sometimes, the cellular material will have a rigid, smooth skin and a cellular core. Polystyrene foam, (styrofoam), and polyurethane foam are examples of commonly-available foams made from polymers. Such foams may be adhered to, formed around or formed integral with fibers, filaments, threads, netting, screen or woven materials such as a fabric whether of plastic or of cotton, wool or other textile material. A polyester may be found very useful as the core material of the sunshield if the polyester is reinforced with fibers, filaments, threads, netting, screen or woven materials.

One method of forming bubble plastics, explained in U.S. Pat. No. 4,535,828, issued Aug. 20, 1985, embosses two films of polyethylene, creating peaks and valleys and adheres the films together at the peaks, which causes the valleys to form closed cell bubbles. That patent discloses the use of a slitted laminate of metallized polyethylene in a folding window shade used in a building.

Corrugated material, honeycomb material and other expanded materials may be found suitable for use as the sunshield material herein, particularly if they are heat-insulative in character.

Foam material, cellular material and bubble plastics are particularly advantageous as the core material of the impressionable material or as one or more of the layers in the sunshield because they provide insulation against heat transfer through the sunshield.

Other impressionable materials may be found to be suitable. For example, certain insulative plastics, whether of single layer or multiple layers of the same or differing materials, which are not made into foam, may be found quite suitable in practicing this invention.

The impressionable materials may be reflective in themselves or it may be desirable to add a reflective coat. Aluminum paint, nickel paint or silver paint and other metallic paints and combinations thereof on a plastic film are customarily used to provide reflective coatings. The sunshield material may be comprised of multilayers and one or more of the layers may be a reflective layer. The reflective layer may be comprised of a reflective metallic paint deposited on a polymer, such as Mylar, polyethylene, vinyl, polyvinyl chloride, acrylate, or any number of other suitable plastic films. Paper or other material may also be used. Such reflective layer preferably has an outer, protective layer of a transparent film placed over it, although it may be found that the reflective coating could be placed on the inside of an outer, protective film which would thus serve a dual purpose. U.S. Pat. No. 4,261,649, Reflective Sun Screen, teaches the use of an acrylic outer coating over a layer of reflective Mylar, a polyester. As set forth in that patent, other reflective polyester films are also available for use in providing a reflective coating. A durable, metallic coating could be placed on the outside of the outer film of the sunshield material.

Polyethylene and other films may be used. Of course, numerous thermoplastic and thermosetting films may be found suitable as outer coatings or to be used as films having reflective coatings. The core material could itself be metallized to provide the reflective layer.

The sunshield material may be a single layer of material or it may be comprised of a plurality of layers of the same or of differing materials. In the patent to Kim, cited above, is disclosed the step of heating the outer surfaces of a film such as polyethylene and creating pockets of air, crinkles, in the outer layers, or films, which may or may not be reflective.

By using a semi-rigid or even a rigid material, the sun-shield does not collapse and stays in place, held, for example, by the sun visors of an automobile, the rear view mirror or by other means. Brackets, clips, Velcro, hooks, straps, pins, adhesive or other means may be used to hold the semi-rigid or rigid sunshield in place. The sunshield itself may have suction cups, straps, Velcro, elastic bands and other appurtenances which aid in the use or storage of the sunshield.

The method herein enables quicker and more convenient manufacture of vehicle sunshields. The resulting product is more economical to produce, yet results in a quality product.

In the preferred embodiment of this invention, the sunshield is manufactured from an impressionable material by placing a plurality of creases therein for folding the sunshield. All of the creases are on the same side of the material and alternate creases are slightly wider to allow the material to fold easily over the crease, in the alternate direction. U.S. Pat. No. 4,317,481, to Oswald, utilizes double wide spaces in a thermal barrier comprised of slats placed adjacent each other, but does not teach or suggest any such structure which is accomplished by channels or creases in an impressionable material. In the invention herein, the wider creases allow the material to fold over the side the wider creases are created on. Where the material has a narrow, or smaller, crease, the material is folded away from side the crease lies on. Such narrow creases combined with wider creases allow the sunshield to be folded accordion-like, in alternate directions, folding one direction at a narrow crease and folding the other direction at a wide crease.

It is to be realized that all such creases may be made slightly wider and the sunshield could still be properly folded in alternate directions. Such creases may be parallel or only approximately parallel to each other thus forming planar elements which are rectangles or, possibly, only approximately rectangles. On the other hand, such creases may be at an angle with respect to each other thus forming planar elements which are not rectangles but are approximately trapezoids. If the top and bottom of the sunshield are parallel, the planar elements are trapezoids. If they are not parallel, the planar elements are approximate trapezoids.

It can be seen that the creases form hinge-like connections between adjoining planar elements. More than one crease may be used between adjacent elements. That is, there may be two creases, side by side, two creases which overlap or two creases a small distance apart in order to create, in effect, a wider crease.

Folding of a sunshield in alternate directions, which is accordion-like, is taught in Levy but Levy makes no suggestion of wider creases nor of placing all creases nor placing of all channels on the same side of the sunshield material.

Although the preferred embodiment of this invention has all of the creases on the same side of the sunshield material, another embodiment might have some creases on the opposite side, but this invention does not have the creases located alternately on opposite sides of the material, as in Kim, mentioned above.

If it is considered that the sunshield material has two opposing sides, in back-to-back relationship, it may be seen that the creases or channels of this invention are all located on one of the sides. There are no creases or channels, used for accordion-like folding, in the other side of the sunshield material. Of course, there may be creases or channels irrelevant to the accordion-like folding, in such other side, but there are no creases in the other side about which the sunshield material is folded in the accordion-like folding of the sunshield.

The creases or channels may be v-shaped, u-shaped having a round bottom, or channel-shaped having a substantially flat bottom. The same kind of crease or the same kind of a channel may be used throughout a sunshield or they may be varied in a single sunshield, as desired. Such creases may be cold-formed or heat-formed as desired and depending on the material or materials being used. The creases or channels may be formed, during the process of manufacturing the material, by extrusion or other process. Preferably, the material is comprised of a thermoplastic foam or a thermoplastic bubble pack and creases are formed using heat-forming of creases after the material is manufactured.

Creases are preferably formed by a creasing tool or shoe, but, less preferable creases may be formed by a slitting mechanism as set forth in U.S. Pat. No. 4,535,828.

If a protective film or a reflective film are added to the core material, the creasing may be done before the film or films are added or after the film or films are added, depending on the nature and thickness of the added film or films. If a thick, hardy film is to be added to the core material, the creasing would likely be done after the film is added to the core material. On the other hand, a thin or very flexible film could be added to a core material after the core material is creased.

This invention comprises both a foldable sunshield product and a method of manufacture of the foldable sunshield product from an impressionable material without having to crease the material alternately on opposing sides as taught by Kim, cited above.

Consequently, this invention removes the requirement to turn the material over in order to place creases on the alternate side or to have additional jigs and fixtures which will crease the material simultaneously from both sides. In mass production, creasing the material on a single side constitutes a substantial and important time-saving and cost-saving feature.

Therefore, an object of this invention is to provide a sunshield manufactured from impressionable material which folds in alternate directions along a successive plurality of creases on the same side of the impressionable material.

Another object of this invention is to provide a sunshield manufactured from impressionable material which has alternate creases of wide and narrow widths.

It is another object of this invention to provide a sunshield of impressionable material which folds accordion-like along creases, all of which creases are on the same side of the impressionable material.

It is, therefore, an object of this invention to provide a method of manufacture of a foldable sunshield which is economical and convenient.

Still another object of this invention is to provide a method of manufacture of a foldable sunshield which creases the sunshield material on a single side.

Further objects and features may be seen from the following figures and description. It is to be understood that the drawings are designed for illustrative purposes and are not intended to define the limits of the invention.

BRIEF DESCRIPTION OF THE DRAWINGS

FIG. 8 is a cross-section of sunshield material showing two layers of film on each side of the core material of the sunshield.

FIG. 9 is a cross-section of sunshield material showing one layer on each side of the sunshield material, each layer serving as both reflective coating and protective covering.

FIG. 10 is a cross section of sunshield material having two layers of film on each side of the core material and showing, in dotted lines, how a creasing block compresses the core material into a hinge-like connection between planar elements of the sunshield.

FIG. 11 is a cross section of sunshield material having two layers of film on each side of the core material and showing, in dotted lines, how a wide creasing block compresses the core material into a hinge-like structure between planar elements of the sunshield, so that adjacent planar elements can be folded over the wide crease.

FIG. 12 is an end view of a folded sunshield made in accordance with the invention, showing the folds at each side of the folded sunshield resulting from all creases being on the same side of the sunshield material, as shown, for example, in the end view of an unfolded sunshield in FIG. 3.

FIG. 13 is an end view of a folded sunshield made in accordance with one embodiment of the invention, showing the folds at each side of the folded sunshields resulting from two v-shaped creases on alternate sides of the sunshield material, followed by one wider crease on the same side as the second of said creases.

FIG. 13A is an end view of the unfolded sunshield of FIG. 13, showing the disposition of the wide and narrow creases.

FIG. 14 is an end view of an unfolded sunshield, showing a variation in creases, in an embodiment which requires only two wider creases.

FIG. 15 is an end view of an unfold sunshield, showing another variation in disposition of creases.

DESCRIPTION

Figure 1:
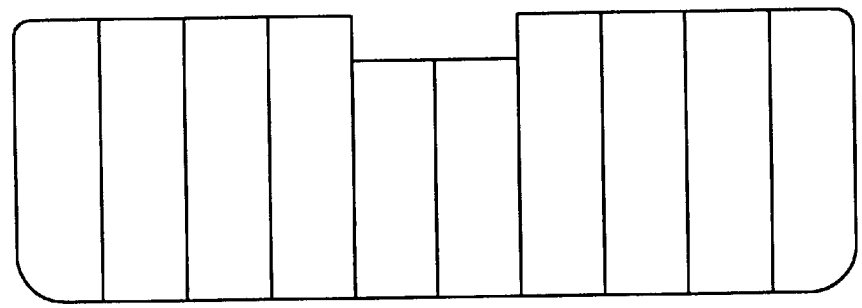
FIG. 1 is a prior art sunshield.

FIG. 1 is a prior art sunshield having planar, rectangular elements in accordance with the Levy patent cited above and commonly made out of corrugated cardboard.

Figure 2:
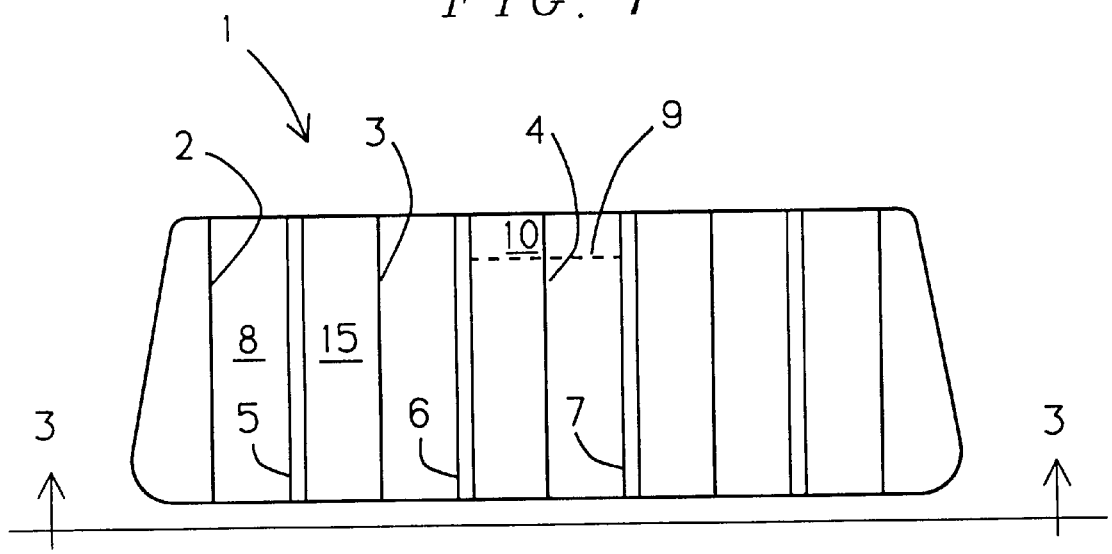
FIG. 2 is a sunshield of the invention creased in accordance with the preferred embodiment of the invention.

FIG. 2 is a sunshield 1 of the invention of a shape fitted to the windshield of an automobile. Creases 2, 3 and 4 are representative of narrow creases in the sunshield material. Creases 5, 6 and 7 are representative of the wider creases in the sunshield material. It may be seen that the creases form a hinge-like structure between planar elements 8 and 15 and the other planar elements, or panels, of the sunshield 1. Dotted line 9 indicates that a removable portion 10 might be included in the sunshield so that the sunshield could easily be installed past the rearview mirror. A suitable score line at dotted line 9 and around the rest of portion 10 would allow portion 10 to be removed. Such portion 10 could also be a bendable portion, to move it out of the way so the rearview mirror could extend through the space occupied by portion 10.

The creases shown in FIG. 2 may be made by moving the material under creasing dies or rollers or by moving the dies or rollers over the material. The creases might also be formed by a long, stamping die or dies which make one or more complete creases at a time. A firm, underlying base is provided underneath the sunshield material in order to cause the material to crease properly.

Figure 3:
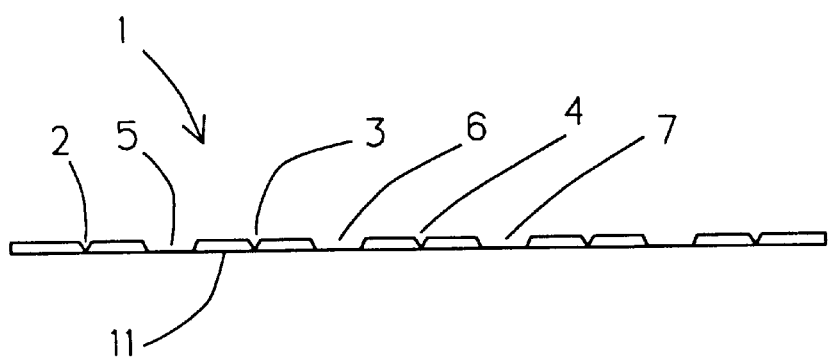
FIG. 3 is an end view of the unfolded sunshield of FIG. 2, viewed from line 3—3, FIG. 2, showing creases in the sunshield as being v-shaped, alternating with wider, channel-shaped creases and all on the same side of the sunshield material.

FIG. 3 is an end view of the unfolded sunshield 1 of FIG. 2, viewed from line 3—3, FIG. 2, showing creases 2, 3 and 4 in the sunshield as being v-shaped, alternating with wider, channel-shaped creases 5, 6 and 7 and all on the same side of the sunshield material 11.

Figure 4:
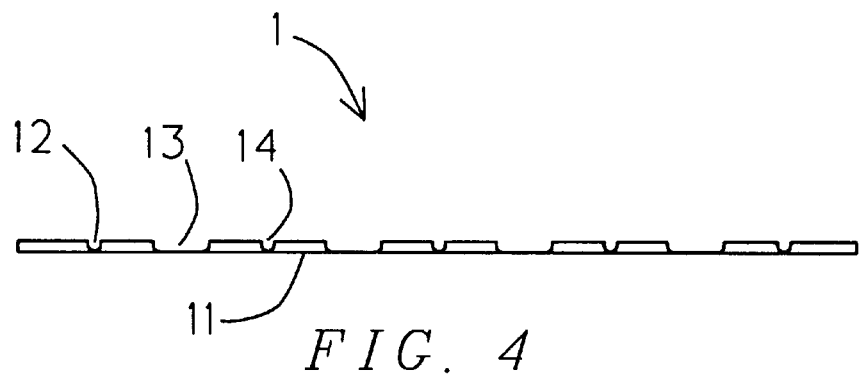
FIG. 4 is an end view, similar to FIG. 3, of an unfolded sunshield, showing creases in the sunshield as being u-shaped with rounded bottoms and all on the same side of the sunshield material.

FIG. 4 is an end view, taken on a line similar to FIG. 3, of an unfolded sunshield 1, showing exemplary narrow, wide, narrow creases 12, 13 and 14, respectively, in the sunshield as being u-shaped with rounded bottoms, rather than v-shaped as in FIG. 3. It is noted that all of the creases in FIG. 4 are on the same side of the sunshield material 11.

Figure 5:
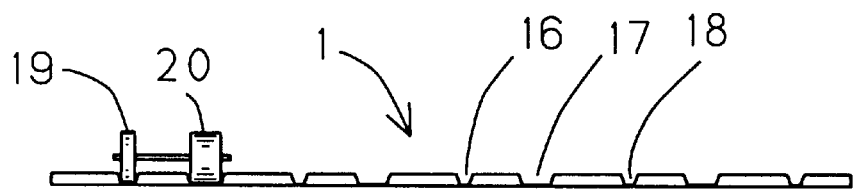
FIG. 5 is a similar end view of an unfolded sunshield, showing creases in the sunshield as being channel-shaped, having a flat bottom and all on the same side of the material.

FIG. 5 is a similar end view of an unfolded sunshield 1, showing exemplary creases 16, 17 and 18, in the sunshield material 11, as being channel-shaped, having a flat bottom and all on the same side of the material. Such narrow and wide creases could be made, for example, by rollers 19 and 20 which are narrow and wide, respectively. In this embodiment, the material is moved under a number of such rollers, to cause the material to be creased at the proper locations. If, for example, the sunshield material is a thermoplastic, heated rollers or dies could be used to form a more lasting crease more readily in the thermoplastic. A simple upturned piece of wood or metal that is heated could serve as a suitable die to form such creases, by moving either the die or the material. As stated previously, long, stamping dies, could be used to create one or more entire creases at a time. Such dies may be heated if the material is thermoplastic.

Figure 6:
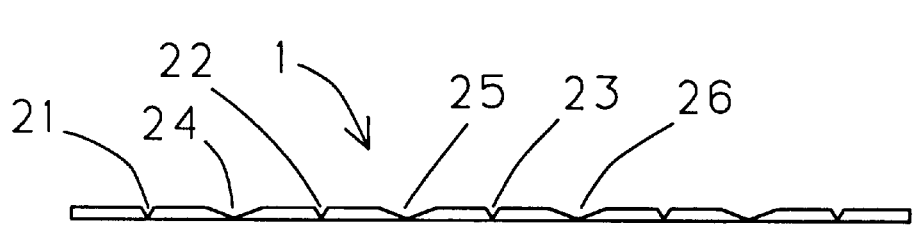
FIG. 6 is a similar end view of an unfolded sunshield, showing creases as all being v-shaped and on all on the same side of the material.

FIG. 6 is a similar end view of an unfold ed sunshield 1, showing the creases as all being v-shaped and on all on the same side of the material 11. Narrow v-shaped creases 21, 22, and 23 alternate with wider v-shaped creases 24, 25 and 26.

Figure 7:
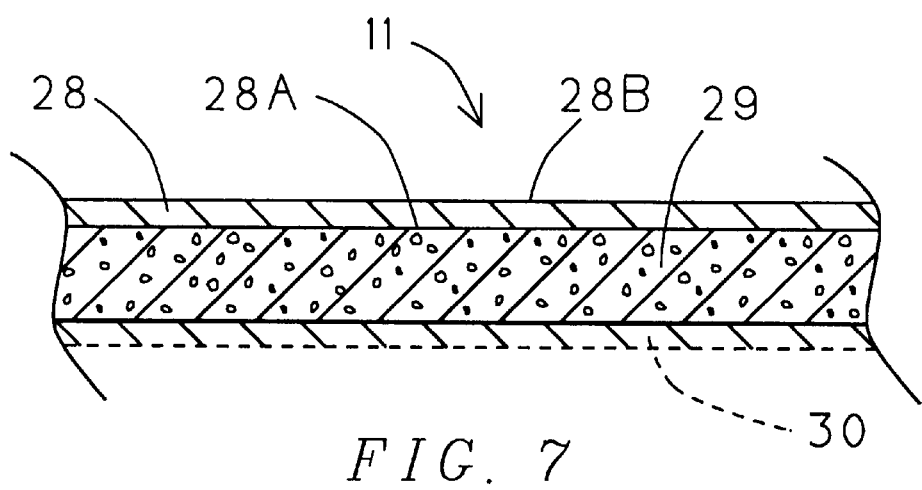
FIG. 7 is a cross-section of sunshield material showing a single layer film on one side of the core material of the sunshield and a possible single layer film, in dotted lines, on the other side.

FIG. 7 is a cross-section of sunshield material 11 showing a single layer film 28 on one side of a sunshield core material 29 which is shown, in this instance, as being a foam. A single layer film 30 may also be included on the other side of the material core material 29, as shown in dotted lines. Film 28 may be a durable, protective, film, say, a Mylar film, a polyester, for the core 29 of foam. Alternatively, film 28 could be a film of an other polyester, an acrylic, a polyvinylchloride, a polyethylene or other suitable exterior film coating. Ultra-violet blockers, colorants or dyes may be included in the film 28 to prevent deterioration of the sunshield by sunlight over a long period of time.

The film 28 may have a reflective coating on the inside surface 28A or the outside surface 28B of the film 28. It may, itself, comprise a lamination of films. Metallization of films and laminations of film layers is well-known in the window film trade, as is the use of adhesives, ultraviolet blockers, dyes and colorants. If the core material 29 has a reflective surface, the film 28 may be merely a durable, protective film. Alternately, film surface 28A may be an opaque backing which does not let light pass through. Film 28 may have holes therein or may be comprised, itself, of bubbles or foam, depending on the purpose intended to be served. Preferably, it is both a protective coating and has a reflecting surface. It may also add to the heat-insulating quality of the sunshield material.

FIG. 8 is a cross-section of sunshield material 32 showing two layers of film 33 and 34 on one side of core material 35 and two layers of film 36 and 37 on the other side of core material 35. In this embodiment, film layers 33 and 36, which are the outside layers, are protective layers and, thus, are preferably tougher and more durable than the inner films. There may be a reflective coating or a reflective layer, for example, between films 33 and 34 or, for example, between film 34 and core material 35. Such reflective layer might be, for example silver, aluminum or nickel which is painted, sprayed, evaporated or otherwise deposited onto any of the desired surfaces. Alter-natively, there may be a separate layer of a reflective material, metal or otherwise.

FIG. 9 is a cross-section of sunshield material 40 showing a film 41 on the top of core material 42 and a film 43 on the bottom of core material 42. Such film 41 is made of material which is itself reflective. The film 43, on the bottom of core material 42 may be also made reflective to provide a uniform product, or a product that can be reversed and used with either side facing toward the sun. Films 41 and 43 serve as both reflective films and protective films.

FIG. 10 is a cross section of sunshield material 45 having two layers of film 46 and 47 on the top on one side of the core material 48 and two layers of film 49 and 50 on the other side of core material 48. In FIG. 10, core material 48 is not shown as being comprised of a foam. Core material 48 may be a foam, or may not be a foam but may be composed of other impressionable material. Die 51, shown as a stamping die, in dotted lines, would cause the material to be creased as shown by dotted lines 52 and 53. Die 51 may be long, creating an entire crease at a time, or it may be designed as a block which moves across the material or past which the material moves, to create an entire crease. The underlying structure 54 provides support to allow the creasing to be properly accomplished. If the sunshield material is thermoplastic, either creasing die 51 or underlying structure 54 may be heated, or both may be heated. It may be seen from FIG. 10 how the creasing die 51 compresses the core material 45 into a hinge-like connection between planar elements of the sunshield. Creasing die 51, as shown in FIG. 10, is of insufficient width to cause a crease over which the material may be folded. The creases formed by die 51, shown in FIG. 10, would only allow the material 45 to be folded away from the crease. Creasing die 51 would have to be about 2½ to 3½ times as wide as that shown, in order to crease material 48 suitably so that it could be folded over the crease.

FIG. 11 is a cross section of sunshield material 45 having two layers of film 46 and 47 on the top of core material 48 and two layers of film 49 and 50 on the bottom of core material 48. Creasing die 55 is much wider than creasing die 51, of FIG. 10. FIG. 11 shows, by dotted creasing lines 56 and 57, how a wide creasing die 55 compresses the core material so that the material 45 can be folded over the crease. That is, the creasing die 55 creates a crease that is a wide, hinge-like connection between planar elements of the sunshield, so that adjacent planar elements can be folded over the wide crease. As in FIG. 10, underlying structure 52 provides a backing against which the crease is made. Either or both of the creasing die 55 and the underlying structure 52 may be heated to assist in the creasing process.

FIG. 12 is an end view of a folded sunshield 1 made in accordance with one embodiment of the invention, shown in an end view in FIG. 3. The view is taken when the sunshield 1 is folded, on the view line 3—3, FIG. 2, showing the folds at the left side 61 of sunshield 1 and the folds at the right side 62 of the folded sunshield 1. In this embodiment, all creases are on the same side of the sunshield material, as shown in the end view of the unfolded sunshield 1 in FIG. 3. Creases 2, 3, 5 and 6 may be compared with those shown in FIG. 3 to see that all creases are on the same side of the material and alternate creases 5, 6 and 7 are wide enough for the sunshield material to be folded over the crease. FIG. 12, if unfolded by unfolding the bottom panel 11A first, downwardly and to the left, correlates the creases in sunshield 1 of FIG. 10 with the creases of sunshield 1 of FIG. 3.

FIG. 13 is a similar end view of a folded sunshield 64 made in accordance with one embodiment of the invention, showing the folds at each side of the folded sunshields resulting from a wide crease 65 followed by two v-shaped creases 66 and 67 on alternate sides of the sunshield material, followed by one wide crease 68 on the same side as crease 67. This may be understood better by reference to FIG. 13A.

FIG. 13A is an end view of the sunshield 64 of FIG. 13, when unfolded, with the bottom panel 11A unfolded first, downwardly and to the left. Wide crease 65, on the bottom of the material 11, is followed by alternating creases 66 and 67 which are, in turn, followed by wide crease 68 on the same side as crease 67. The pattern of creases is continued, a wide crease followed by alternating narrow creases.

FIG. 14 is an end view of an unfolded sunshield 69, showing a variation in creases, in an embodiment which requires only two wider creases. Narrow crease 70 is followed by narrow crease 71 on the alternate side of material 11, followed by wide crease 72 on the same side as narrow crease 71. Then follows three narrow alternating crease 73, 74 and 75, followed, in turn, by a wide crease 76 and narrow creases 77 and 78 which are on opposite sides from each other.

FIG. 15 is an end view of an unfolded sunshield 79, showing another variation in disposition of creases. Alternating narrow creases 80 and 81 are followed by wide crease 82, followed by narrow crease 83, wide crease 84, narrow crease 85, wide crease 86, narrow crease 87 and narrow crease 88 on the alternate side of material 11. It is noted that, in this embodiment, all creases are on the same side of material 11 except the two end creases 80 and 88, which are on the opposite side from all other creases.

Although specific embodiments and certain structural arrangements have been illustrated and described herein, it will be clear to those skilled in the art that various other modifications and embodiments may be made incorporating the spirit and scope of the underlying inventive concepts and that the same are not limited to the particular forms herein shown and described except insofar as determined by the scope of the appended claims.

I claim:

1. A foldable sunshield for a vehicle window, said sunshield having a top edge and a bottom edge, said sunshield comprised substantially entirely of an impressionable material which is at least semi-rigid, a plurality of successive channels formed by creasing said material, said channels extending across said material from said top edge to said bottom edge and along which channels said sunshield is foldable in an accordion-like manner, said channels all being on the same side of said material, and wherein at least alternate ones of said channels permit said sunshield to fold over said alternate channels.

2. The sunshield of claim 1 wherein said impressionable material has a thickness, and wherein said channels are formed by creases in said material and at least said alternate ones of said creases are approximately twice as wide as the thickness of said material.

3. The sunshield of claim 1 wherein said material is comprised substantially throughout, of a layer of insulating material and a layer of thermoplastic material and wherein said channels are formed by creases in said insulating material and said thermoplastic material and wherein at least alternate ones of said creases are approximately twice as wide as the thickness of said material.

4. The sunshield of claim 1 bottom and said channels extend across said material substantially from said top to said wherein said channels form approximately ten adjoining panels in said material, and wherein each of said approximately ten adjoining panels extends entirely across said sunshield wherein said channels provide hinge-like connections between said adjoining panels.

5. A sunshield, said sunshield being adapted to cover the interior side of the windshield of a vehicle, said sunshield having a top edge and a bottom edge and wherein said sunshield is comprised of one or more layers of material, said one or more layers of material being at least semi-rigid, at least one of said layers comprised of an impressionable material, a plurality of creases in succession in said impressionable material, said successive creases defining the sides of approximately ten, elongated, planar elements formed in said impressionable material, wherein each of said elongated, planar elements extend from said top edge to said bottom edge, and wherein said creases further provide hinge-like connections between said planar elements and adapt said planar elements to fold accordion-like, and wherein said creases are all on the same side of said material.

6. A method of manufacturing a sunshield for an automobile windshield, said sunshield being foldable accordion-like, said method comprising the steps of providing a sunshield material having one or more layers of heat-insulating material, creasing said material from said top edge of said sunshield to said bottom edge of said sunshield at a plurality of locations on said sunshield material, on only one side of said sunshield, said creasing disposed to allow said sunshield to fold accordion-like along said creases.

7. The method of claim 6 wherein said creasing creates alternating wider and narrower creases, said wider creases being wide enough for said sunshield material to fold over said wider creases.

8. The method of claim 6 wherein said material is comprised substantially throughout of impressionable material comprising one or more layers of a foam material, a bubble plastic material, a crinkle plastic material or a cardboard.

* * * * *